US012607198B2

(12) United States Patent
Reilly et al.

(10) Patent No.: US 12,607,198 B2
(45) Date of Patent: Apr. 21, 2026

(54) NOZZLE FOR A FAN ASSEMBLY

(71) Applicant: Dyson Technology Limited, Malmesbury (GB)

(72) Inventors: Philip Tennison Reilly, Gloucester (GB); Samuel Douglas Clifford, Malmesbury (GB); Ben Thomas Edmonds, Swindon (GB)

(73) Assignee: Dyson Technology Limited, Malmesbury (GB)

( * ) Notice: Subject to any disclaimer, the term of this patent is extended or adjusted under 35 U.S.C. 154(b) by 0 days.

(21) Appl. No.: 18/568,255

(22) PCT Filed: May 25, 2022

(86) PCT No.: PCT/GB2022/051315

§ 371 (c)(1),
(2) Date: Dec. 7, 2023

(87) PCT Pub. No.: WO2022/269222

PCT Pub. Date: Dec. 29, 2022

(65) Prior Publication Data

US 2024/0271634 A1 Aug. 15, 2024

(30) Foreign Application Priority Data

Jun. 22, 2021 (GB) ..................................... 2108927

(51) Int. Cl.
*F04D 29/42* (2006.01)
*F04D 25/08* (2006.01)
*F04D 29/46* (2006.01)

(52) U.S. Cl.
CPC ......... *F04D 29/4246* (2013.01); *F04D 25/08* (2013.01); *F04D 29/464* (2013.01); *F05D 2240/128* (2013.01); *F05D 2250/52* (2013.01)

(58) Field of Classification Search
CPC ....... F04D 25/08; F04D 29/464; F04D 27/002
See application file for complete search history.

(56) References Cited

U.S. PATENT DOCUMENTS 1,395,201 A 10/1921 Oberfell et al.
2,488,467 A 11/1949 De Lisio Salvatore
(Continued)

FOREIGN PATENT DOCUMENTS

CN 2185861 Y 12/1994
CN 1993243 A 7/2007
(Continued)

OTHER PUBLICATIONS

Combined Search and Examination Report received for GB Application No. 2313951.2, mailed on Oct. 17, 2023, 2 pages.
(Continued)

*Primary Examiner* — Nathaniel E Wiehe
*Assistant Examiner* — Jackson N Gillenwaters
(74) *Attorney, Agent, or Firm* — Tucker Ellis LLP

(57) ABSTRACT

A nozzle for a fan assembly is described. The nozzle includes a first duct through which a first airflow moves, and a second duct through which a second airflow moves. The first duct has a first outlet for emitting the first airflow, and the second duct has a second outlet for emitting the second airflow. The first and the second outlets are arranged such that the first and second airflows collide to generate a combined airflow having a direction defined by the relative flow rates of the first and second airflows. The second duct has a constant restriction, and the first duct has a variable restriction to vary the flow rate of the first airflow.

19 Claims, 6 Drawing Sheets

(56) References Cited

U.S. PATENT DOCUMENTS

| | | | | |
|---|---|---|---|---|
| 3,362,494 | A | 1/1968 | Boehler et al. | |
| 3,774,262 | A | 11/1973 | Anthony et al. | |
| 3,823,653 | A | 7/1974 | Roos | |
| 4,220,145 | A | 9/1980 | Stamp et al. | |
| 4,395,201 | A | 7/1983 | Bron | |
| 5,156,085 | A | 10/1992 | Bossche | |
| 5,411,371 | A | 5/1995 | Chen | |
| 5,524,827 | A | 6/1996 | Znamensky et al. | |
| 5,821,475 | A | 10/1998 | Morehead et al. | |
| 6,156,085 | A | 12/2000 | Chiu et al. | |
| 6,341,760 | B1 | 1/2002 | Rawlings | |
| 6,604,694 | B1 | 8/2003 | Kordas et al. | |
| 8,308,445 | B2 | 11/2012 | Gammack et al. | |
| 8,734,121 | B2 | 5/2014 | Tsen | |
| 11,305,618 | B2 * | 4/2022 | Schaal | B60H 1/345 |
| 11,454,247 | B2 | 9/2022 | MacQueen et al. | |
| 11,680,581 | B2 | 6/2023 | Jukes et al. | |
| 11,767,853 | B2 | 9/2023 | Horton et al. | |
| 2007/0089531 | A1 | 4/2007 | Wood | |
| 2008/0014855 | A1 | 1/2008 | Leserre | |
| 2009/0047892 | A1 | 2/2009 | Brancheriau et al. | |
| 2010/0014959 | A1 | 1/2010 | Azzouz et al. | |
| 2012/0034108 | A1 | 2/2012 | Wallace et al. | |
| 2012/0051884 | A1 | 3/2012 | Junkel et al. | |
| 2012/0263573 | A1 | 10/2012 | Tadokoro et al. | |
| 2013/0104415 | A1 | 5/2013 | Han et al. | |
| 2013/0280051 | A1 | 10/2013 | Nicolas et al. | |
| 2014/0210114 | A1 | 7/2014 | Staniforth et al. | |
| 2014/0255173 | A1 | 9/2014 | Poulton et al. | |
| 2014/0286747 | A1 | 9/2014 | Fang et al. | |
| 2014/0348658 | A1 | 11/2014 | Cunnane | |
| 2015/0300663 | A1 | 10/2015 | Hirakawa et al. | |
| 2016/0121695 | A1 | 5/2016 | Sakurai | |
| 2016/0152116 | A1 | 6/2016 | Albin et al. | |
| 2017/0087500 | A1 | 3/2017 | Combs et al. | |
| 2017/0094903 | A1 | 4/2017 | Baes et al. | |
| 2017/0190240 | A1 | 7/2017 | Paris | |
| 2018/0064303 | A1 | 3/2018 | Meggle et al. | |
| 2018/0080676 | A1 | 3/2018 | Cho et al. | |
| 2018/0353923 | A1 | 12/2018 | Hoener et al. | |
| 2019/0118340 | A1 | 4/2019 | Mase | |
| 2019/0315200 | A1 | 10/2019 | Pestke | |
| 2019/0345946 | A1 | 11/2019 | Register et al. | |
| 2020/0178749 | A1 | 6/2020 | Royale et al. | |
| 2021/0031594 | A1 | 2/2021 | Schaal | |
| 2021/0270282 | A1 | 9/2021 | Macqueen et al. | |
| 2021/0270283 | A1 | 9/2021 | Macqueen et al. | |
| 2021/0270284 | A1 | 9/2021 | Jukes et al. | |
| 2021/0270292 | A1 | 9/2021 | Macqueen | |
| 2021/0381518 | A1 * | 12/2021 | Horton | F04D 25/08 |
| 2022/0290686 | A1 | 9/2022 | Jukes et al. | |
| 2023/0028614 | A1 | 1/2023 | Marcel et al. | |
| 2023/0383758 | A1 | 11/2023 | Horton et al. | |

FOREIGN PATENT DOCUMENTS

| | | | | |
|---|---|---|---|---|
| CN | 101649842 | A | 2/2010 | |
| CN | 101985949 | A | 3/2011 | |
| CN | 102235385 | A | 11/2011 | |
| CN | 103133300 | A | 6/2013 | |
| CN | 203272264 | U | 11/2013 | |
| CN | 103807149 | A | 5/2014 | |
| CN | 203627312 | U | 6/2014 | |
| CN | 203770175 | U | 8/2014 | |
| CN | 204084763 | U | 1/2015 | |
| CN | 104895768 | A | 9/2015 | |
| CN | 105041625 | A | 11/2015 | |
| CN | 105508311 | A | 4/2016 | |
| CN | 105644302 | A | 6/2016 | |
| CN | 106123272 | A | 11/2016 | |
| CN | 106286327 | A | 1/2017 | |
| CN | 206035913 | U | 3/2017 | |
| CN | 106573522 | A | 4/2017 | |
| CN | 106884815 | A | 6/2017 | |
| CN | 106969482 | A | 7/2017 | |
| CN | 207317217 | U | 5/2018 | |
| CN | 210829911 | U | 6/2020 | |
| CN | 211174828 | U | 8/2020 | |
| CN | 211231040 | U | 8/2020 | |
| CN | 211343521 | U | 8/2020 | |
| CN | 211901107 | U | 11/2020 | |
| DE | 3644590 | A1 | 7/1988 | |
| DE | 10350949 | A1 | 11/2004 | |
| DE | 102015001477 | A1 | 12/2015 | |
| DE | 102015116242 | B3 | 9/2016 | |
| DE | 102016107227 | A1 | 10/2017 | |
| EP | 0610866 | A1 | 8/1994 | |
| EP | 3321114 | A1 | 5/2018 | |
| EP | 3610866 | A1 | 2/2020 | |
| FR | 2772311 | A1 | 6/1999 | |
| FR | 3034175 | A1 | 9/2016 | |
| GB | 1347978 | A | 2/1974 | |
| GB | 2463698 | A | 3/2010 | |
| GB | 2482549 | A | 2/2012 | |
| GB | 2493672 | A | 2/2013 | |
| GB | 2496464 | A | 5/2013 | |
| GB | 2499042 | A | 8/2013 | |
| GB | 2502103 | A | 11/2013 | |
| GB | 2578616 | A | 5/2020 | |
| JP | 61-195235 | A | 8/1986 | |
| JP | 03-244959 | A | 10/1991 | |
| JP | 06-313603 | A | 11/1994 | |
| JP | 2004-322981 | A | 11/2004 | |
| JP | 2009-204240 | A | 9/2009 | |
| JP | 2012-030718 | A | 2/2012 | |
| JP | 2012-145308 | A | 8/2012 | |
| JP | 2014-058257 | A | 4/2014 | |
| JP | 2014-088774 | A | 5/2014 | |
| JP | 2014-234936 | A | 12/2014 | |
| JP | 5663051 | B2 | 2/2015 | |
| JP | 2015-175309 | A | 10/2015 | |
| KR | 10-0225915 | B1 | 10/1999 | |
| KR | 10-1601325 | B1 | 3/2016 | |
| KR | 10-1647382 | B1 | 8/2016 | |
| KR | 10-1735432 | B1 | 5/2017 | |
| KR | 20210019067 | A | 2/2021 | |
| TW | 336963 | B | 7/1998 | |
| WO | 99/07569 | A1 | 2/1999 | |
| WO | 2010/100451 | A1 | 9/2010 | |
| WO | WO-2013035271 | A1 * | 3/2013 | F04D 25/10 |
| WO | 2014/075399 | A1 | 5/2014 | |
| WO | 2017/050754 | A1 | 3/2017 | |
| WO | 2018/058892 | A1 | 4/2018 | |
| WO | 2020/002877 | A1 | 1/2020 | |
| WO | 2020/089579 | A1 | 5/2020 | |
| WO | 2020/089580 | A1 | 5/2020 | |
| WO | 2020/089581 | A1 | 5/2020 | |
| WO | 2022/269222 | A1 | 12/2022 | |

OTHER PUBLICATIONS

English Translation of WO-2018058892-A 1 (Fei) obtained Mar. 9, 2023 (Year: 2018).

Evaluation Report dated Aug. 10, 2020, directed to CN Application No. ZL2019209769775; 13 pages.

Evaluation Report dated Jul. 15, 2020, directed to CN Application No. ZL201920977040X; 13 pages.

Evaluation Report dated Nov. 16, 2020, directed to CN Application No. ZL2019218644124; 13 pages.

Evaluation Report of Patentability of Utility Model dated Nov. 11, 2020, directed to CN Application No. ZL201920989943X; 14 pages.

Examination Report received for GB Application No. 2108927.1, mailed on Sep. 4, 2023, 2 pages.

Fei et al., WO 2018/058892, 2018, English Machine Translation (Year: 2018).

International Preliminary Report on Patentability received for PCT Patent Application No. PCT/GB2019/051712, mailed on Jan. 21, 2021, 8 pages.

International Preliminary Report on Patentability received for PCT Patent Application No. PCT/GB2019/051713, mailed on Jan. 7, 2021, 8 pages.

(56) References Cited

OTHER PUBLICATIONS

International Preliminary Report on Patentability received for PCT Patent Application No. PCT/GB2019/051714, mailed on Jan. 7, 2021, 8 pages.
International Preliminary Report on Patentability received for PCT Patent Application No. PCT/GB2019/051715, mailed on Jan. 7, 2021, 7 pages.
International Preliminary Report on Patentability received for PCT Patent Application No. PCT/GB2019/052834, mailed on May 14, 2021, 8 pages.
International Search Report and Written Opinion mailed Dec. 17, 2019, directed to International Application No. PCT/GB2019/052834; 11 pages.
International Search Report and Written Opinion received for PCT Patent Application No. PCT/GB2019/051712, mailed on Sep. 24, 2019, 9 pages.
International Search Report and Written Opinion received for PCT Patent Application No. PCT/GB2019/051713, mailed on Sep. 25, 2019, 9 pages.
International Search Report and Written Opinion received for PCT Patent Application No. PCT/GB2019/051714, mailed on Sep. 24, 2019, 9 pages.
International Search Report and Written Opinion received for PCT Patent Application No. PCT/GB2019/051715, mailed on Oct. 2, 2019, 8 pages.
International Search Report and Written Opinion received for PCT Patent Application No. PCT/GB2019/052833, mailed on Dec. 17, 2019, 11 pages.
International Search Report and Written Opinion received for PCT Patent Application No. PCT/GB2022/051314, mailed on Aug. 31, 2022, 12 pages.
International Search Report and Written Opinion received for PCT Patent Application No. PCT/GB2022/051315, mailed on Aug. 31, 2022, 10 pages.
Office Action received for Chinese Patent Application No. 201910559580.0, mailed on Jul. 2, 2021, 22 pages (14 pages of English Translation and 8 pages of Original Document).
Office Action received for Chinese Patent Application No. 201910566663.2, mailed on Jul. 2, 2021, 25 pages (15 pages of English Translation and 10 pages of Original Document).
Office Action received for Patent Application No. KR 10-2021-7000200, mailed on May 20, 2022, 13 pages (7 pages of English Translation and 6 pages of Original Document).
Office Action received for Patent Application No. KR 10-2021-7000470, mailed on May 20, 2022, 11 pages (6 pages of English Translation and 5 pages of Original Document).
Search Report dated Apr. 30, 2019, directed to GB Application No. 1817852.5; 1 page.
Search Report dated Dec. 10, 2018, directed to GB Application No. 1810538.7; 1 page.
Search Report dated Dec. 10, 2018, directed to GB Application No. 1810539.5; 1 page.
Search Report dated Dec. 19, 2018, directed to GB Application No. 1810540.3; 1 page.
Search Report dated Dec. 19, 2018, directed to GB Application No. 1810541.1; 1 page.
Search Report received for GB Application No. 2108924.8, mailed on Nov. 30, 2021, 1 page.
Search Report received for GB Application No. 2108927.1, mailed on Dec. 2, 2021, 1 page.
Singapore Search Report and Written Opinion Received for SG Application No. 11202009931S, mailed on May 20, 2022, 8 pages.
The First Office Action dated Dec. 7, 2020, directed to CN Application No. 201910559831.5; 18 pages.
The First Office Action dated May 6, 2021, directed to CN Application No. 201911050925.6; 15 pages.
The First Office Action dated Oct. 12, 2020, directed to CN Application No. 201910559580.0; 16 pages.
The First Office Action dated Oct. 12, 2020, directed to CN Application No. 201910566663.2; 13 pages.

* cited by examiner

NOZZLE FOR A FAN ASSEMBLY

CROSS-REFERENCE TO PRIOR APPLICATIONS

This application is a § 371 National Stage Application of PCT International Application No. PCT/GB2022/051315 filed May 25, 2022, which claims the priority of United Kingdom Application No. 2108927.1, filed Jun. 22, 2021, each of which are herein incorporated by reference in their entirety.

FIELD OF THE INVENTION

The present invention relates to a nozzle for a fan assembly, and to a fan assembly comprising the nozzle.

BACKGROUND OF THE INVENTION

A fan assembly may comprise a nozzle from which an airflow is projected. The direction of the airflow may be controlled by rotating and/or tilting the nozzle. Alternatively, the fan assembly may comprise a valve that is moveable to change the direction in which the airflow is projected from the nozzle.

SUMMARY OF THE INVENTION

The present invention provides a nozzle for a fan assembly, the nozzle comprising: a first duct through which a first airflow moves, the first duct having a first outlet for emitting the first airflow; and a second duct through which a second airflow moves, the second duct having a second outlet for emitting the second airflow, wherein: the first and the second outlets are arranged such that the first and second airflows collide to generate a combined airflow having a direction defined by the relative flow rates of the first and second airflows, the first duct has a variable restriction to vary the flow rate of the first airflow, and the second duct has a constant restriction.

The direction of the combined airflow projected from the nozzle may therefore be controlled by varying the restriction of the first duct. The second duct, by contrast, has a constant restriction. As a result, changes in the direction of the combined airflow may be achieved in a potentially quieter manner with less leaks and other pressures losses. Additionally, changes in the direction of the combined airflow may be achieved is a less complex and thus more cost-effective manner.

The nozzle could conceivably comprise a valve which is moveable to vary the restriction of both ducts. For example, movement of the valve may increase the restriction in one duct and simultaneously decrease the restriction in the other duct. However, this is likely to lead to higher turbulence in the airflows moving through the ducts. In particular, separation of each of the airflows may occur at the valve, resulting in swirl. Higher turbulence has several drawbacks, including increased noise and increased pressure losses. Additionally, higher turbulence may mean that the airflows emitted from the outlets, rather than being highly laminar and focussed, are more diffuse. This in turn may adversely affect the direction, spread and/or speed of the combined airflow. Furthermore, there are likely to be additional leak paths when employing a valve that is moveable to vary the restriction of both ducts. In particular, a gap is likely to exist between the valve and each of the ducts.

By varying the restriction of just the first duct, the second airflow may move through the second duct is a less turbulent way, thereby reducing noise and pressure losses. Additionally, leak paths in the second duct, which might otherwise be present due to a moving valve, may be avoided. By varying the restriction of just the first duct, the range of possible movement of the combined airflow may be reduced. However, the applicant has identified that a relatively good range of movement of the combined airflow can nevertheless be achieved.

The first and second outlets may be arranged such that the first airflow is emitted along a first axis, the second airflow is emitted from the second outlet along a second axis, and the first axis and the second axis intersect at an angle of between 120 and 160 degrees. By arranging the outlets such that a relatively large intersect angle is created between the two airflows, a relatively wide range of movement in the combined airflow may be achieved. This then helps compensate for the loss in range of movement that arises from varying the restriction of just the first duct.

The first and second outlets may be arranged such that the first airflow is emitted in an upward direction relative to a base of the nozzle, and the second airflow is emitted in a downward direction relative to the base. That is to say that the first and second airflows have vertical components that are respectively upward and downward. As a result, through appropriate control of the flow rates of the first and second airflows, a combined airflow may be projected from the nozzle in a direction generally parallel to the base. Accordingly, when the nozzle forms part of a fan assembly and the fan assembly is resting on a horizontal surface, the nozzle may project the combined airflow in a substantially horizontal direction. The fan assembly may therefore be placed at a similar height to a user, seated or standing, and an airflow may be projected in the general direction of the user.

The nozzle may comprise a body moveable to vary the restriction of the first duct. Moreover, the body may be located within or form part of the first duct. The provision of a moving body provides a convenient means for varying the restriction. In moving the body, the restriction of the second duct is unchanged. As a result, the flow rate of the first airflow and thus the direction of the combined airflow may be varied without adversely affecting the second airflow. As noted above, by having a less turbulent second airflow, noise and pressure losses may be reduced, and the second airflow emitted from the second outlet may be less diffuse.

Where the nozzle comprises a body, the body may be moveable to vary a size of the first outlet. The size of the first outlet may therefore be varied in order to vary the flow rate. In particular, a lower flow rate may be achieved by having a smaller first outlet. As the flow rate of the first airflow is reduced, the decrease in the size of the first outlet helps ensure that the airflow emitted from first outlet continues to have a relatively high flow velocity. As a result, better control of the direction, spread, and/or speed of the combined airflow may be achieved. By contrast, if the first outlet were of a fixed size then, as the flow rate of the first airflow is reduced, the flow velocity of the airflow emitted from the first outlet will be lower. The first airflow will therefore have a lower speed and a higher spread when colliding with the second airflow. As a result, the direction, spread and/or speed of the combined airflow may be less well controlled.

The first outlet may be defined by an end of the body. The body may then move relative to a static portion of the nozzle in order to vary the size of the first outlet. This then provides a convenient method for varying the size of the first outlet.

The body may comprise a portion of the first duct. By employing a portion of the duct to vary the restriction, rather than a separate body that moves within the duct, the restriction of the first duct and thus the flow rate of the first airflow may be varied without unduly increasing turbulence in the first airflow.

The portion may slide relative to the further portion of the first duct. As a result, leakage of the first airflow moving through the duct may be reduced. In particular, as the portion moves, an effective seal may be maintained between the portion and the further portion. The portion may be in sliding contact with the further portion to further minimise leaks. A low-friction material may be provided between the two portions to reduce noise and/or stiction as the portion moves relative to the further portion. Alternatively, the portion may be spaced slightly from the further portion, and the portion may slide relative to the further portion such that the size of the gap between the two portions is unchanged. Consequently, in spite of the provision of a gap between the two portions, the size of the gap is well controlled, and thus excessive leakage may be avoided.

The portion may be located downstream of the further portion, and the portion may slide over an outer surface of the further portion. As a result, a labyrinth seal is created between the portion and the further portion. In particular, the leak path between the two portions requires the first airflow to turn and move in a backward direction in order to pass between the portion and the further portion. As a result, leakage of the first airflow moving through the duct may be reduced.

The nozzle may comprise an actuator for moving the body, and the actuator may comprise an electric motor. As a result, the restriction of the first duct and thus the direction of the combined airflow projected from the nozzle may be controlled remotely. For example, the fan assembly may comprise a control unit which receives commands wirelessly from a user device (e.g. a remote control or mobile device running a suitable application) and which controls the actuator in response to the received commands.

The present invention also provides a fan assembly comprising a nozzle as described in any one of the preceding paragraphs.

The restriction of the first duct may be variable between a maximum size and a minimum size, the combined airflow may have a first flow direction when the restriction is at the maximum size and a second flow direction when the restriction is at the minimum size, and the first and second flow directions may differ by at least 45 degrees. As a result, the fan assembly projects a combined airflow having a direction that can be varied over a relatively wide range of angles by varying the restriction of the first duct only.

The restriction of the first duct may be variable to a size in which, when the fan assembly rests on a horizontal surface, the combined airflow has a flow direction having an angle of between −10 and +10 degrees relative to the horizontal surface. As a result, when resting on a horizontal surface, the fan assembly is nevertheless capable of projecting the combined airflow in a substantially horizontal direction. The fan assembly may therefore be placed at a similar height to a user, seated or standing, and an airflow may be projected in the general direction of the user.

When the fan assembly rests on a horizontal surface, the first airflow may be emitted from the first outlet in an upward direction and the second airflow may be emitted from the second outlet in a downward direction. That is to say that the vertical components of the first and second airflows are respectively upward and downward. As a result, through appropriate control of the flow rates of the first and second airflows, the fan assembly may project a combined airflow in a generally horizontal direction.

DETAILED DESCRIPTION OF THE INVENTION

Figure 1:
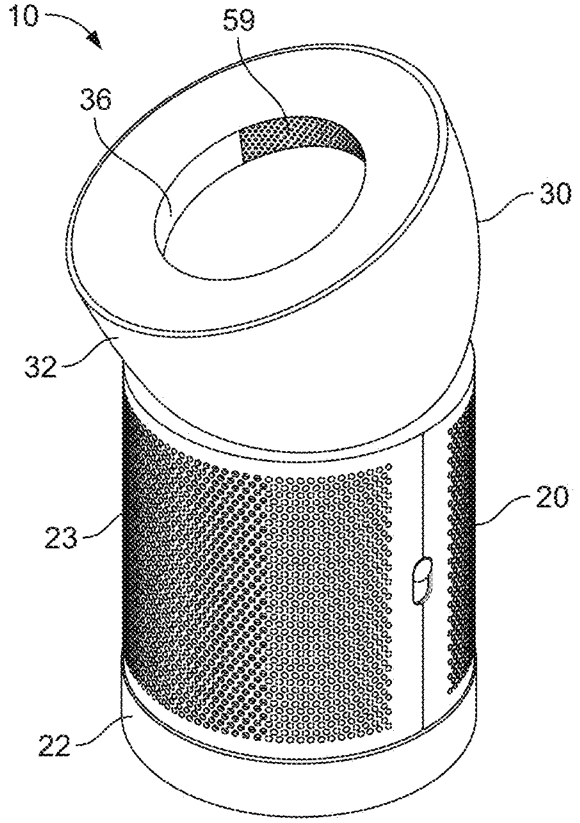
FIG. 1 is a perspective view of a fan assembly.
Figure 2:
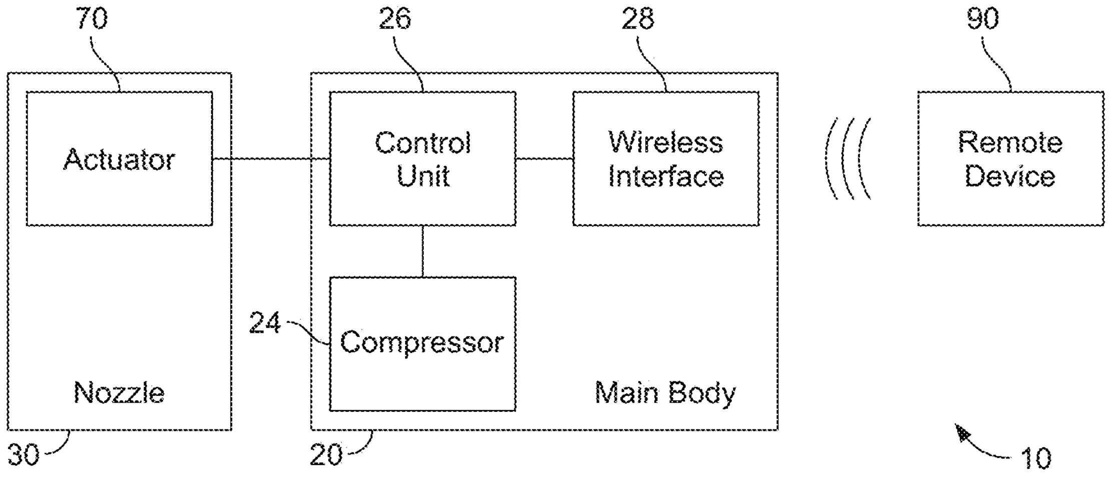
FIG. 2 is a block diagram of electrical components of the fan assembly.

The fan assembly 10 of FIGS. 1 and 2 comprises a main body 20 to which a nozzle is attached.

The main body 20 comprises a housing 22, a compressor 24, a control unit 26 and a wireless interface 28.

The housing 22 is generally cylindrical in shape and houses the compressor 24, the control unit 26 and the wireless interface 28. The housing 24 comprises an inlet through which an airflow is drawn into the main body 20 by the compressor 24, and an outlet through which the airflow is emitted from the main body 20 and into the nozzle 30. In the example shown in FIG. 1, the inlet comprises a plurality of apertures 23 formed in a side of the housing 22, and the outlet comprises an annular opening (not shown) formed in a top of the housing 22.

The compressor 24 is housed within the housing 22 and comprises an impeller driven by an electric motor.

The control unit 26 is responsible for controlling the operation of the fan assembly 10. The control unit 26 is connected to the compressor 24, the wireless interface 28 and an actuator 70 of the nozzle 30. The control unit 26 controls the compressor 24 and the actuator 70 in response to control data received from the wireless interface 28. For example, the control unit 26 may power on and off the compressor 24, control the speed of the compressor 24 and thus the flow rate of the airflow, and/or control the position of the actuator 70 and thus the direction of the airflow projected from the fan assembly 10, as described below in more detail. The wireless interface 28 receives control data from a remote device 90 operated by a user. The remote device 90 may comprise, for example, a dedicated remote control or a mobile device, such as a phone or tablet. A user is then able to control remotely the flow rate and/or the direction of the airflow projected from the fan assembly 10.

The control unit 26 may additionally comprise a user interface for controlling the operation of the fan assembly 10. For example, the control unit 26 may comprise buttons, dials, a touchscreen or the like for powering on and off the compressor 24, as well as controlling the flow rate and the direction of the airflow.

Referring now to FIGS. 3 to 7, the nozzle 30 comprises a housing 32, a first duct 40, a second duct 50, a guide body 60 and an actuator 70.

The housing 32 has the general shape of a truncated ellipsoid or sphere, with a first truncation forming a face of the nozzle 30 and a second truncation forming at least part of a base of the nozzle 30. The housing 32 houses the first duct 40, the second duct 50 and the actuator 70. The housing 32 comprises an inlet 34 formed in a base of the housing 32. The inlet 34 is annular in shape and opens into a plenum 35 or manifold, again located at the base of the housing 32. The housing 32 further comprises a circular opening 36 formed in a top of the housing 32 (see FIG. 1).

The first and second ducts 40,50 extend upwardly within the housing 32. Moreover, the ducts 40,50 extend upwardly from the plenum 35 on opposite sides of the housing 32. Each of the ducts 40,50 then has an inlet 41,51 that is open to the plenum 35.

The airflow emitted from the main body 20 enters the plenum 35 of the nozzle 30 via the inlet 34 in the housing 32. The airflow then bifurcates. A first airflow 45 moves through the first duct 40 and is emitted from a first outlet 42 at the end of the first duct 40. A second airflow 55 then moves through the second duct 50 and is emitted from a second outlet 52 at the end of the second duct 50. The first and second outlets 42,52 are arranged such that the first and second airflows 45,55 collide to generate a combined airflow 80. This combined airflow 80 is then projected from the nozzle 30 via the opening 36 in the housing 32.

The guide body 60 is curved or dome-shaped and extends between the outlets 42,52 of the two ducts 40,50. The airflows 45,55 emitted from the outlets 42,52 then attach to the surface of the guide body 60 by virtue of the Coanda effect. As a consequence, at the point where the two airflows 45,55 collide, the airflows 45,55 are more laminar and less turbulent. As a result, better control is achieved over the direction, spread and/or speed of the combined airflow 80 projected from the nozzle 30.

The direction of the combined airflow 80 is defined by the relative flow rates of the first and second airflows 45,55. The direction of the combined airflow 80 is then varied by varying the flow rate of the first airflow 45. This is achieved by varying the size of the first outlet 42.

The first duct 40 comprises a portion 43 that is moveable to vary the size of the first outlet 42. The portion 43 is moveable between a max-flow position in which the first outlet 42 has a maximum size (i.e. maximum cross-sectional area), and a min-flow position in which the first outlet 42 has a minimum size (i.e. minimum cross-sectional area). The first airflow 45 then has a maximum flow rate when the portion 43 is in the max-flow position, and a minimum flow rate when the portion 43 is in the min-flow position.

Figure 3:
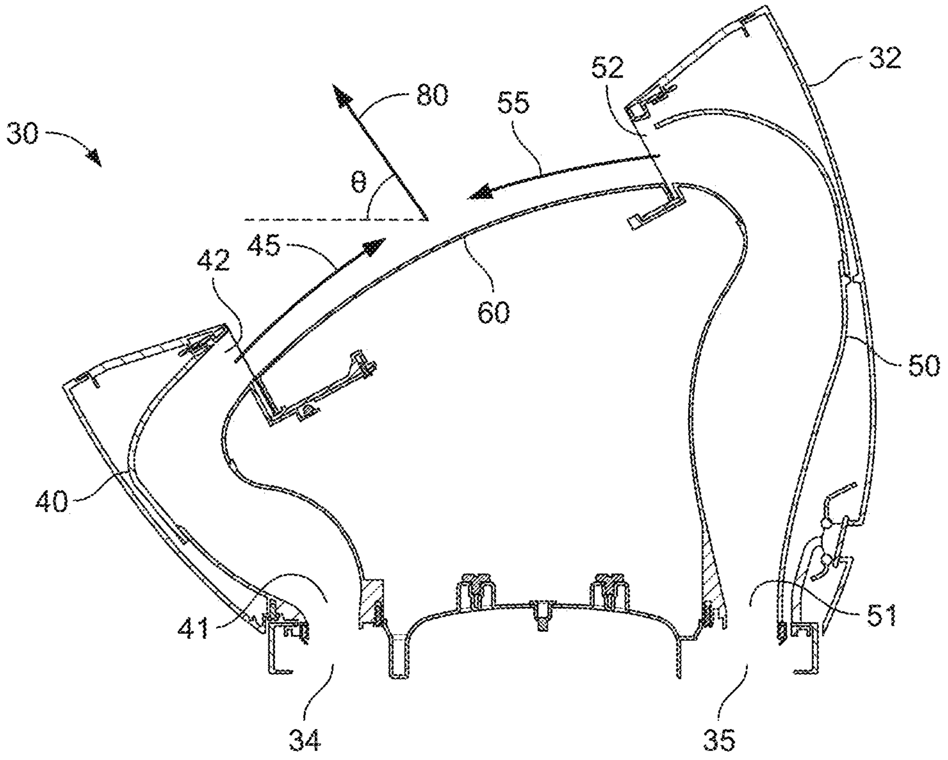
FIG. 3 is a cross-sectional slice through a centre of a nozzle of the fan assembly, the nozzle being in a first configuration.
Figure 4:
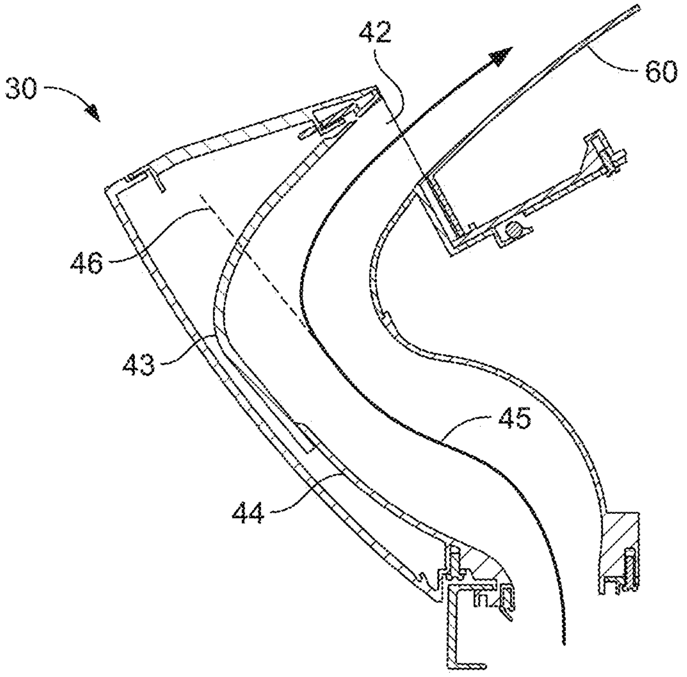
FIG. 4 is an expanded view of part of the nozzle of FIG. 3.
Figure 5:
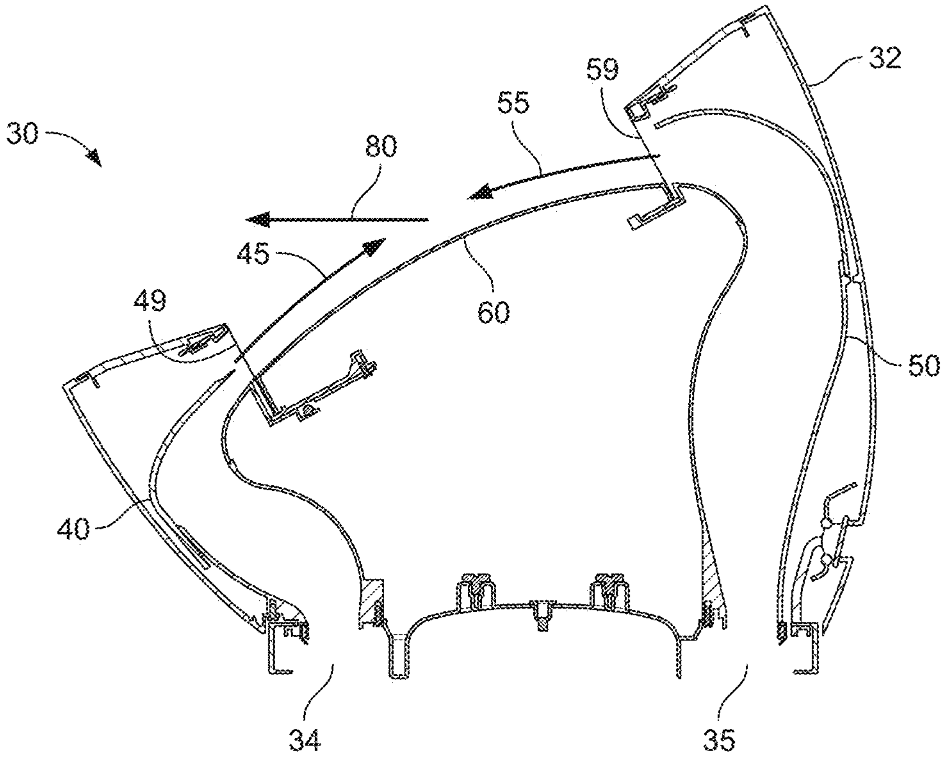
FIG. 5 is a cross-sectional slice through the centre of the nozzle in a second configuration.
Figure 6:
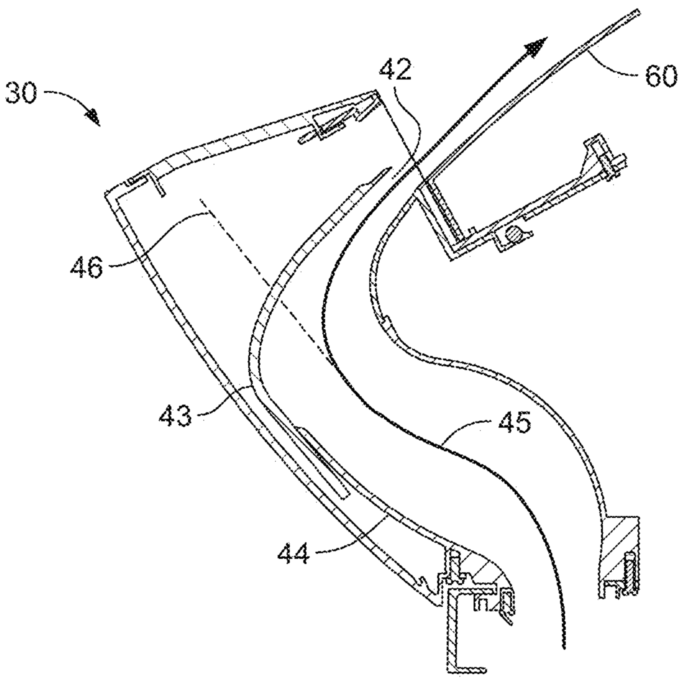
FIG. 6 is an expanded view of part of the nozzle of FIG. 5.

FIGS. 3 and 4 illustrate the nozzle 30 with the portion 43 in the max-flow position (maximum flow rate), and FIGS. 5 and 6 show the nozzle 30 with the portion 43 in the min-flow position (minimum flow rate). By varying the position of the portion 43, the flow rate of the first airflow 45 and thus the direction of the combined airflow 80 may be varied.

The portion 43 moves linearly along an axis 46. The first airflow 45 may be said to be emitted from the first outlet 42 along a first flow axis. The portion 43 is then moveable along an axis 46 substantially perpendicular to the first flow axis. As can be seen in FIGS. 4 and 6, this then has the benefit that the shape of the path taken by the first airflow 45 through the first duct 40 is substantially the same, irrespective of the position of the portion 43. As a result, the flow rate of the first airflow 45 may be varied without unduly increasing the turbulence of the first airflow 45, which in turn has benefits in terms of noise and pressure losses. Additionally, a more focussed and less diffuse airflow 45 may be emitted from the first outlet 42, resulting in better control of the direction, spread and/or speed of the combined airflow 80.

As can be seen in FIGS. 3 to 6, the axis 46 along which the portion 43 moves is substantially perpendicular to the opening 36 formed in the housing 32 of the nozzle 30. This then has the benefit that the size of the first outlet 42 can be varied without changing the alignment of guide body 60 with respect to the opening 36. As a result, the point where the two airflows 45,55 collide is largely unaffected by the position of the portion 43, which provides for better control over the combined airflow 80 projected from the nozzle 30.

Changes in the flow rate of the first airflow 45 are achieved by varying the size of the first outlet 42. As a result, relatively high flow velocities may be maintained as the flow rate of the first airflow 45 decreases. This may then lead to better control of the direction, spread and/or speed of the combined airflow 80. By contrast, if the first outlet 42 were of a fixed size then, as the flow rate of the first airflow 45 decreases, the flow velocity of the airflow 45 emitted from the first outlet 42 will decrease. The first airflow 45 will therefore have a lower speed and a higher spread at the point of collision with the second airflow 55. As a result, the direction, spread and/or speed of the combined airflow 80 may be less well controlled.

When moving between the max-flow and min-flow positions, the portion 43 slides relative to a further portion 44 of the first duct 40. As a result, leakage of the first airflow 45 moving through the first duct 40 may be reduced. In particular, as the portion 43 moves, an effective seal may be maintained between the portion 43 and the further portion 44. The portion 43 may be in sliding contact with the further portion 44 to further reduce leaks. A low-friction material may then be provided between the two portions 43,44 to reduce noise and/or stiction as the portion 43 moves relative to the further portion 44. Alternatively, the portion 43 may be spaced slightly from the further portion 44. Since the portion 43 slides linearly relative to the further portion 44, the size of the gap between the two portions 43,44 is unchanged by movement of the portion 43. Consequently, in spite of the provision of a gap between the two portions 43,44, the size of the gap is well controlled, and thus excessive leakage may be avoided.

In this particular example, the portion 43 slides over the outside of the further portion 44. This then has at least two benefits. First, a smoother, less turbulent transition is provided between the two portions 43,44. By contrast, if the portion 43 were to slide inside the further portion 44, the first airflow 45 would collide with the upstream end of the portion 43 as the first airflow 45 moves through the duct 40. Second, a labyrinth seal is created between the two portions 43,44. In particular, the leak path between the two portions 43,44 requires the first airflow 45 to turn and move in a backward direction in order to pass between the portion 43 and the further portion 44. As a result, leakage of the first airflow 45 moving through the duct 30 may be further reduced.

The first airflow 45 is emitted from the first outlet 42 in an upward direction and the second airflow 55 is emitted from the second outlet 52 in a downward direction. As a result, the combined airflow 80 is projected from the nozzle in a direction having a horizontal component. The combined airflow may be said to be projected at an angle θ relative to the horizontal plane. In this particular example, the combined airflow is projected at an angle of around 55 degrees relative to the horizontal when the portion is in the max-flow position (FIG. 3) and at an angle of around 0 degrees when the portion is in the min-flow position (FIG. 5).

The first and second outlets 42,52 are arranged such that the two airflows 45,55 collide at a relatively shallow angle. As a result, a relatively wide range of movement in the combined airflow 80 may be achieved by varying the flow rate of the first airflow 45. The first airflow 45 may be said to be emitted from the first outlet 42 along a first flow axis, and the second airflow 55 may be said to be emitted from the second outlet 52 along a second flow axis. In this particular example, the first flow axis and the second flow axis intersect at an angle of about 145 degrees. However, a good range of movement in the combined airflow 80 may be achieved with an intersect angle of between 120 and 160 degrees.

The fan assembly 10 is capable of projecting the combined airflow 80 in a direction that can be varied over a relatively wide range of angles by moving only the portion 43 of the first duct 40. Moreover, when resting on a horizontal surface, the fan assembly 10 is capable of projecting the combined airflow 80 in a substantially horizontal direction. The fan assembly 10 may therefore be placed at a similar height to a user (seated or standing) and the combined airflow 80 may be projected in the general direction of the user.

The fan assembly 10 may be configured to project the combined airflow over a different range of angles. For example, if the flow rate of the first airflow were higher (or lower) when the portion 43 is in the max-flow position, the combined airflow 80 would be projected at an angle greater than (or less than) 55 degrees relative to the horizontal. Similarly, if the flow rate of the first airflow 45 were higher (or lower) when the portion 43 is in the min-flow position, the combined airflow 80 would be projected at an angle greater than (or less than) 0 degrees relative to the horizontal. As noted above, the first airflow 45 is emitted from the first outlet 42 in an upward direction and the second airflow 55 is emitted from the second outlet 52 in a downward direction. The direction of the combined airflow 80 may therefore be adjusted by adjusting the pitch of the first and second outlets 42,52, or by adjusting the angle at which the two airflows 45,55 intersect.

For reasons already noted, there are advantages in being able to vary the direction of the combined airflow 80 over a relatively wide range of angles. Accordingly, the fan assembly 10 may be configured such that the combined airflow 80 has a first flow direction when the portion 43 is in the max-flow position and a second flow direction when the portion 43 is in the min-flow position. The first and second flow directions may then differ by at least 45 degrees. Additionally, when the fan assembly rests on a horizontal surface, there may be advantages in being able to direct the combined airflow 80 in a generally horizontal direction. Accordingly, the fan assembly 10 may be configured such that the portion 43 of the first duct 40 is moveable to a position in which the combined airflow 80 is projected at an angle of between −10 and +10 degrees relative to the horizontal surface.

Foreign objects could conceivably fall into the nozzle 30 and find their way into the ducts 40,50. The nozzle 30 therefore comprises a mesh or grill 48,58 (see FIGS. 1 and 5) that is located immediately downstream of each the outlets 42,52 of the ducts 40,50.

Figure 7:
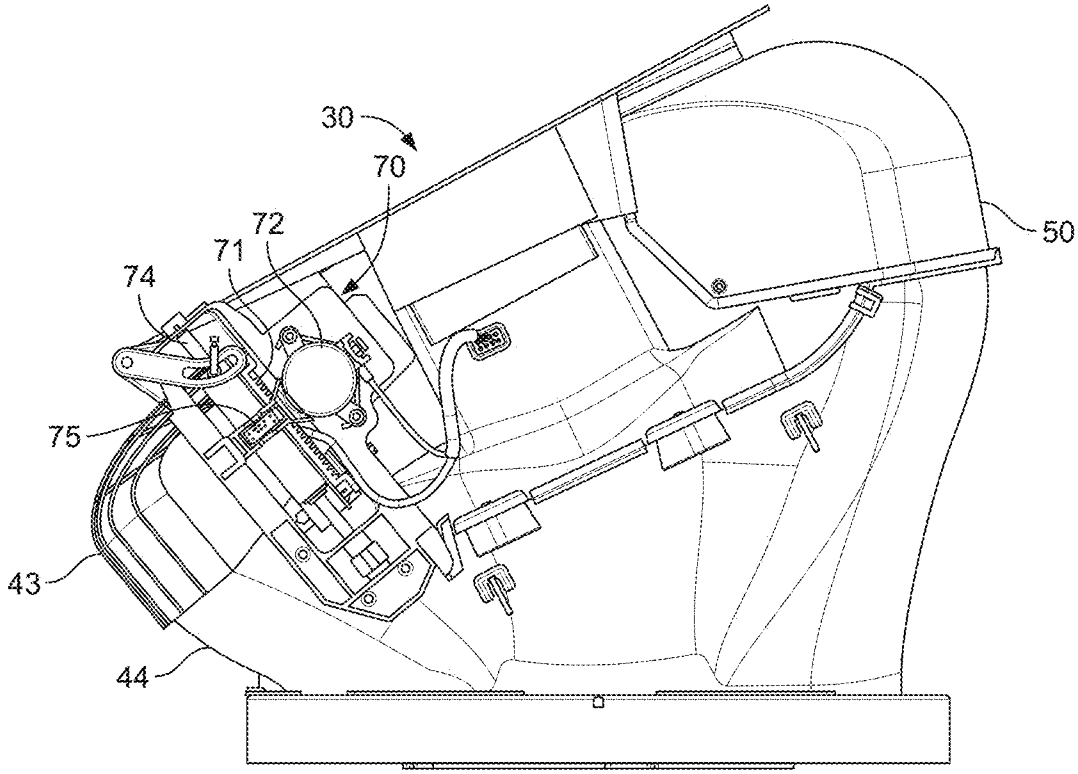
FIG. 7 is a side view of the nozzle, in which a part of the housing of the nozzle has been removed.

Referring now to FIG. 7, the portion 43 of the first duct 40 is moved by the actuator 70. In this particular example, the actuator 70 comprises a rack 71 and pinion (not shown) driven by an electric motor 72, such as a stepper motor. The rack 71 is attached to the portion 43 of the first duct 40. In response to rotation of the pinion by the electric motor 72, the portion 43 moves up and down a support shaft 74. The actuator 70 also comprises a position sensor 75 (e.g. potentiometer or optical sensor) for sensing the position of the rack 71 relative to the pinion, and thus the position of the portion 43. The actuator 70 is controlled by the control unit 26, which drives the electric motor 72 clockwise or counterclockwise in order to move the portion 43 up or down the shaft 74. The control unit 26 then uses the signal output by the position sensor 75 to determine the position of the portion 43. By using an electric motor 72 to move the portion 43, relatively good control may be achieved over the position of the portion 43 and thus the direction of the combined airflow 80. Additionally, the direction of the combined airflow 80 may be controlled remotely. Nevertheless, the portion 43 could be moved by alternative means, including manually by a user.

Figure 8:
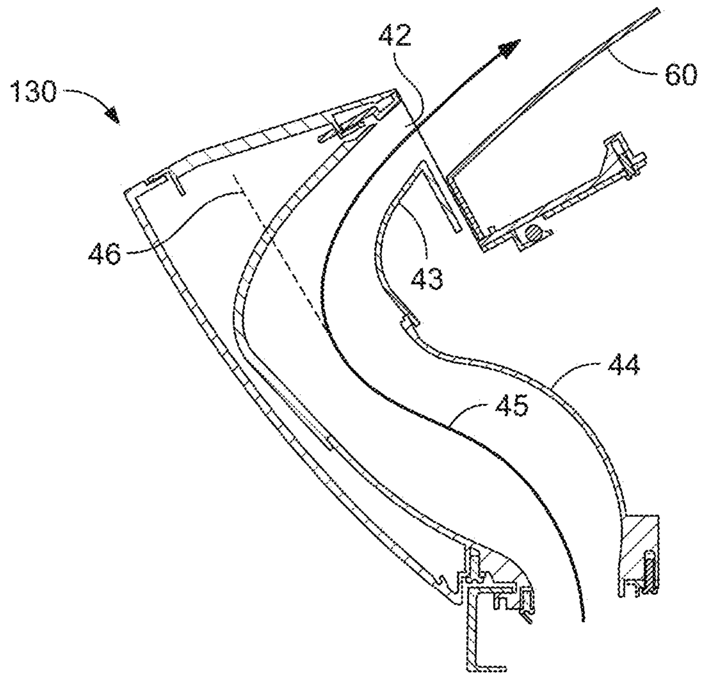
FIG. 8 is an expanded view of part of an alternative nozzle.

With the nozzle 30 described above, the moveable portion 43 of the first duct 40 defines a top of the first outlet 42. FIG. 8 illustrates an alternative nozzle 130 in which the moveable portion 43 defines a bottom of the first outlet 42. In the particular example shown in FIG. 8, the moveable portion 43 is at a position partway between the max-flow and min-flow positions. As can be seen in FIG. 8, as the moveable portion 43 moves from the max-flow position, a step is created between the first outlet 42 and the guide body 60. Consequently, attachment of the first airflow 45 to the guide body 60 may be poorer in comparison to the nozzle 30 described above and illustrated in FIGS. 3 to 6.

In each of the nozzles 30,130 described above, the flow rate of the first airflow 45 (and thus the direction of the combined airflow 80) is varied by moving a portion 43 of the first duct 40. However, as will now be described, the flow rate of the first airflow 45 may be varied by alternative means.

Figure 9:
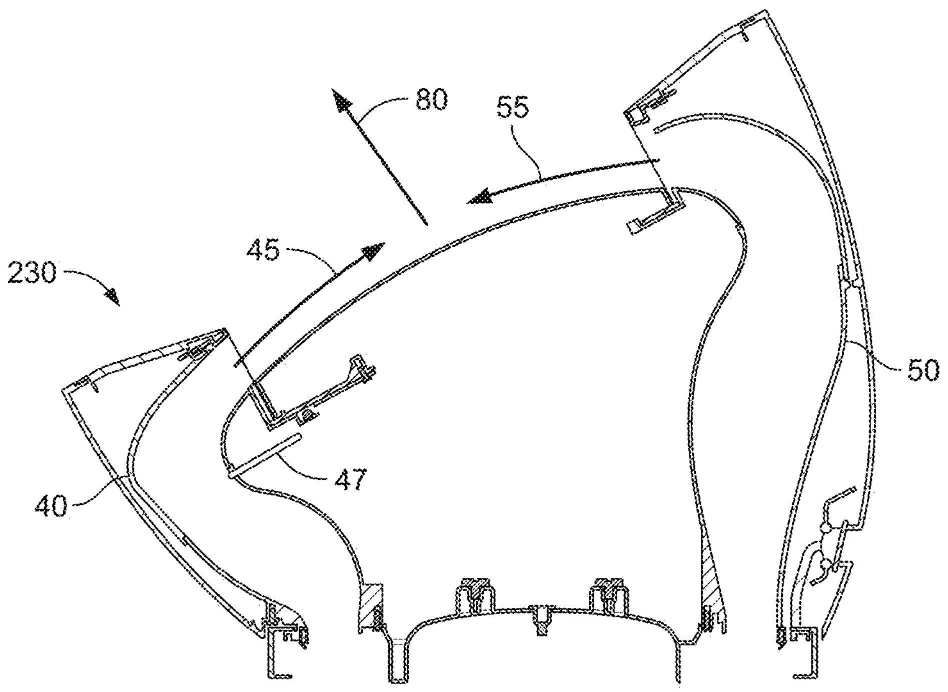
FIG. 9 is a cross-sectional slice through a centre of a further nozzle in a first configuration.
Figure 10:
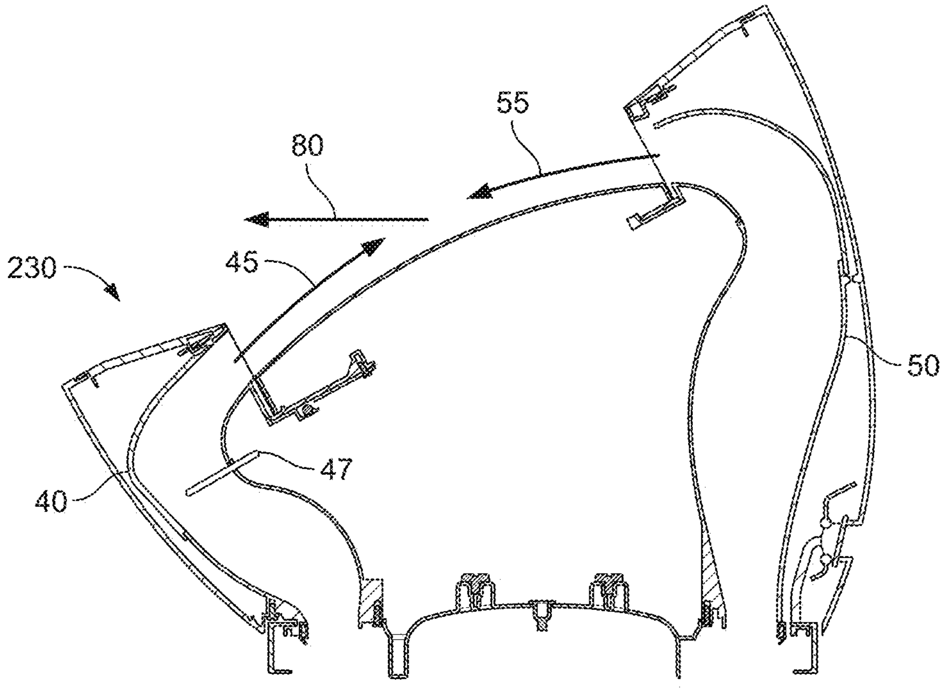
FIG. 10 is a cross-sectional slice through the centre of the further nozzle in a second configuration.

FIGS. 9 and 10 illustrate a further nozzle 230. The nozzle 230 is identical in many respects to those nozzles 30,130 described above and illustrated in FIGS. 3 to 8.

However, rather than the first duct 40 having a moveable portion to vary the flow rate of the first airflow 45, the nozzle 230 instead comprises a paddle 47 located within the first duct 40. The paddle 47 is moveable to vary a restriction within the first duct 40, and thus the flow rate of the first airflow 45. As with the moveable portion 43 of the nozzle 30,130 of FIGS. 3 to 8, the paddle 47 is moveable between a max-flow position and a min-flow position. When the paddle 47 is in the max-flow position, shown in FIG. 9, the restriction in the first duct 40 has a maximum size (i.e. least restrictive). Conversely, when the paddle 47 is in the min-flow position, shown in FIG. 10, the restriction in the first duct 40 has a minimum size (i.e. most restrictive). The first airflow 45 then has a maximum flow rate when the paddle 47 is in the max-flow position, and a minimum flow rate when the paddle 47 is in the min-flow position.

Figure 11:
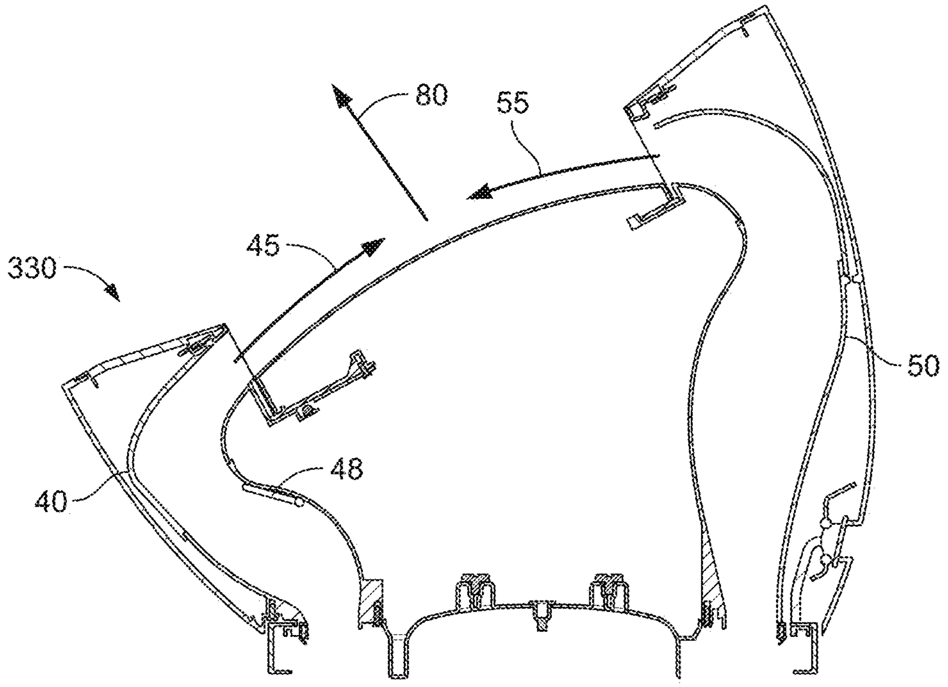
FIG. 11 is a cross-sectional slice through a centre of a still further nozzle in a first configuration.
Figure 12:
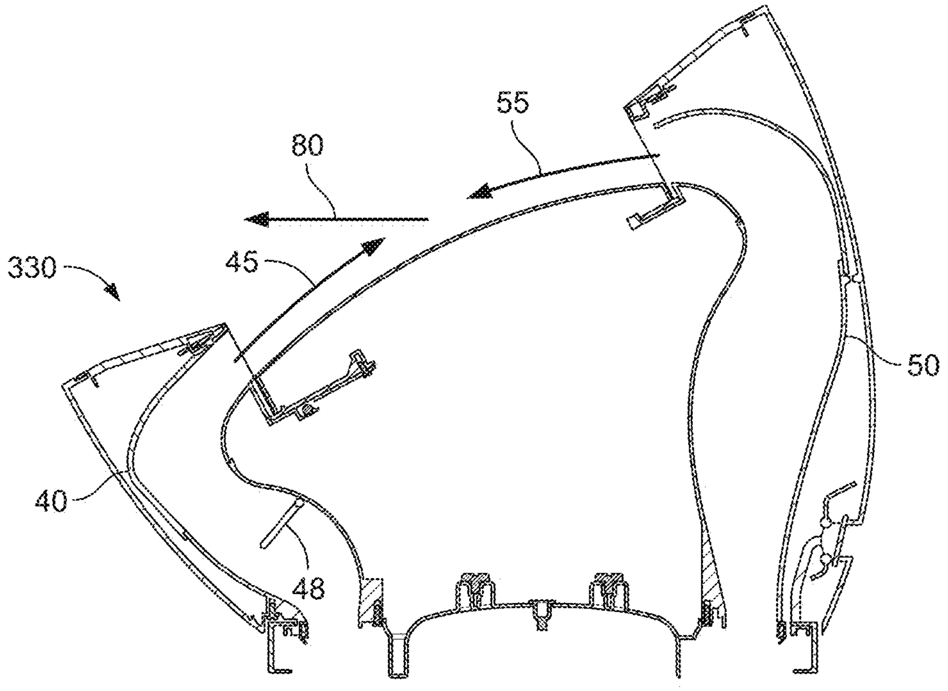
FIG. 12 is a cross-sectional slice through the centre of the still further nozzle in a second configuration.

FIGS. 11 and 12 illustrate a still further nozzle 330. The nozzle 330 is identical in many respects to that illustrated in FIGS. 9 and 10. In particular, the nozzle 330 also comprises a paddle 48 that is moveable within the first duct 40 to vary the flow rate of the first airflow 45. In the nozzle 230 of FIGS. 9 and 10, the paddle 47 moves linearly through an opening or slot in the first duct 40. By contrast, in the nozzle 330 of FIGS. 11 and 12, the paddle 48 pivots or rotates within the first duct 40. Otherwise, the two nozzles 230,330 are identical. The paddle 48 is again moveable to vary a restriction in the first duct 40. More particularly, the paddle 48 is moveable between a max-flow position, shown in FIG. 11, in which the restriction has a maximum size (least restrictive), and a min-flow position, shown in FIG. 12, in which the restriction has a minimum size (i.e. most restrictive). The first airflow 45 then has a maximum flow rate when the paddle 48 is in the max-flow position, and a minimum flow rate when the paddle 48 is in the min-flow position.

In each of the embodiments described above, the nozzle 30,130,230,330 may be said to comprise a body that is moveable to vary a restriction in the first duct 40 and thus the flow rate of the first airflow 45. In the nozzles 30,130 of FIGS. 3 to 8, the body comprises a portion 43 of the first duct 40 which is moveable to vary the size of a restriction at the end of the first duct 40 (i.e. the first outlet 42). In the nozzles 230,330 of FIGS. 9 to 12, the body comprises a paddle 47,48 that moves to vary a restriction within the first duct 40.

In each of the embodiments, changes in the direction of the combined airflow 80 are achieved by varying a restriction in the first duct 40 only. No changes are made to the second duct 50, i.e. the second duct 50 has a constant restriction. The nozzles 30,130,230,330 therefore differ markedly from an arrangement in which a valve moves within the nozzle to simultaneously increase a restriction in one of the ducts and decrease a restriction in the other of the ducts. By varying a restriction in just the first duct 40, the second airflow 55 may move through the second duct 50 in a less turbulent way, thereby reducing noise and pressure losses. Additionally, potential leak paths in the second duct 50 may be avoided. Changes in the direction of the combined airflow 80 may therefore be achieved in a potentially quieter manner with less leaks and other pressures losses. Additionally, changes in the direction of the combined airflow 80 may be achieved is a less complex and thus a more cost-effective manner.

Whilst particular examples and embodiments have been described, it should be understood that these are illustrative only and that various modifications may be made without departing from the scope of the invention as defined by the claims.

The invention claimed is:

1. A nozzle for a fan assembly, the nozzle comprising:

a housing having a base defining an inlet, the base arranged substantially parallel to a horizontal substrate that supports the fan assembly;

a first duct through which a first airflow moves, the first duct having a first outlet for emitting the first airflow; and a second duct through which a second airflow moves, the second duct having a second outlet for emitting the second airflow, wherein:

the first and second outlets are arranged such that the first and second airflows collide to generate a combined airflow having a direction defined by the relative flow rates of the first and second airflows, and the first and second outlets are arranged such that the first airflow is emitted along a first flow axis, the second airflow is emitted along a second flow axis, and the first flow axis and the second flow axis intersect at an angle between 120 and 160 degrees relative to the base, the first duct is movable between a maximum flow position and a minimum flow position such that the first outlet has a variable restriction and is configured to vary the flow rate of the first airflow, and the second duct is fixed such that the second outlet is unrestricted and is configured to provide the second airflow at a constant flow rate.

2. The nozzle as claimed in claim 1, wherein the first and the second outlets are arranged such that the first airflow is emitted in an upward direction relative to a base of the nozzle, and the second airflow is emitted in a downward direction relative to the base.

3. The nozzle as claimed in claim 1, wherein the nozzle comprises a body moveable to vary the restriction of the first duct.

4. The nozzle as claimed in claim 3, wherein the body is located within or forms part of the first duct.

5. The nozzle as claimed in claim 3, wherein the body is moveable to vary a size of the first outlet.

6. The nozzle as claimed in claim 3, wherein the body comprises a portion of the first duct.

7. The nozzle as claimed in claim 6, wherein the portion slides relative to a further portion of the first duct.

8. The nozzle as claimed in claim 7, wherein the portion is located downstream of the further portion, and the portion slides over an outer surface of the further portion.

9. The nozzle as claimed in claim 3, wherein the nozzle comprises an actuator for moving the body, the actuator comprising an electric motor.

10. A fan assembly comprising the nozzle as claimed in claim 1.

11. The fan assembly as claimed in claim 10, wherein the restriction of the first duct is variable between a maximum size and a minimum size, the combined airflow has a first flow direction when the restriction is at the maximum size and a second flow direction when the restriction is at the minimum size, and the first and second flow directions differ by at least 45 degrees.

12. The fan assembly as claimed in claim 10, wherein the restriction of the first duct is variable to a size in which, when the fan assembly rests on a horizontal surface, the combined airflow has a flow direction having an angle of between −10 and +10 degrees relative to the horizontal surface.

13. The fan assembly as claimed claim 10, wherein, when the fan assembly rests on a horizontal surface, the first airflow is emitted from the first outlet in an upward direction and the second airflow is emitted from the second outlet in a downward direction.

14. A nozzle for a fan assembly, the nozzle comprising:

a substantially spherical or ellipsoid housing;

a first duct through which a first airflow moves, the first duct having a first outlet for emitting the first airflow;

a second duct through which a second airflow moves, the second duct having a second outlet for emitting the second airflow; and a curved or dome-shaped guide body extending between the first and second outlets, and arranged such that airflows emitted from the first and second outlets attach to a surface of the guide body by virtue of the Coanda effect, wherein:

the first and second outlets are arranged such that the first and second airflows collide to generate a combined airflow having a direction defined by the relative flow rates of the first and second airflows, the first duct is movable between a maximum flow position and a minimum flow position such that the first outlet has a variable restriction and is configured to vary the flow rate of the first airflow, and the second duct is fixed such that the second outlet has a constant restriction, and the second outlet emits the second airflow with a constant flow rate.

15. The nozzle as claimed in claim 14, wherein the first and second outlets are arranged such that the first airflow is emitted along a first flow axis, the second airflow is emitted along a second flow axis, and the first flow axis and the second flow axis intersect at an angle of between 120 and 160 degrees.

16. The nozzle as claimed in claim 14, wherein the first and the second outlets are arranged such that the first airflow is emitted in an upward direction relative to a base of the nozzle, and the second airflow is emitted in a downward direction relative to the base.

17. The nozzle as claimed in claim 14, wherein the nozzle comprises a body moveable to vary the restriction of the first duct.

18. The nozzle as claimed in claim 17, wherein the body is a portion of the first duct that slides relative to a further portion of the duct.

19. A nozzle for a fan assembly, the nozzle comprising:

a housing having a base configured to attach the fan assembly, the base arranged substantially parallel to a horizontal substrate supporting the fan assembly;

a first duct through which a first airflow moves, the first duct having a first outlet for emitting the first airflow; and a second duct through which a second airflow moves, the second duct having a second outlet for emitting the second airflow, wherein:

the first and second outlets are arranged such that the first airflow is emitted in an upward direction relative to the base of the nozzle, and the second airflow is emitted in a downward direction relative to the base of the nozzle and the first and second airflows collide to generate a combined airflow having a direction defined by the relative flow rates of the first and second airflows, the first duct is movable between a maximum flow position and a minimum flow position such that the first outlet has a variable cross section and is configured to vary the flow rate of the first airflow, and the second outlet is fixed such that it has a fixed cross section and is configured to emit the second airflow with a constant flow rate.

* * * * *